United States Patent [19]
Shodo

[11] Patent Number: 5,798,989
[45] Date of Patent: Aug. 25, 1998

[54] OPTICAL PICKUP DEVICE FOR REPRODUCING INFORMATION RECORDED ON A RECORDING MEDIUM

[75] Inventor: Kenzo Shodo, Kyoto, Japan

[73] Assignee: Rohm Co., Ltd., Kyoto, Japan

[21] Appl. No.: 833,422

[22] Filed: Apr. 7, 1997

[30] Foreign Application Priority Data

Apr. 8, 1996 [JP] Japan ................................ 8-085170

[51] Int. Cl.$^6$ ............................................. G11B 7/13
[52] U.S. Cl. .......................... 369/44.41; 369/44.42
[58] Field of Search .................... 369/44.42, 44.41, 369/44.28, 44.35, 44.34, 44.27, 44.14, 44.11, 112, 120, 124

[56] References Cited

U.S. PATENT DOCUMENTS

| | | | |
|---|---|---|---|
| 4,654,838 | 3/1987 | Sugiki | 369/44.42 |
| 4,807,211 | 2/1989 | Getreuer | 369/44.41 X |
| 5,107,102 | 4/1992 | Noda et al. | 369/44.41 X |

Primary Examiner—Muhammad N. Edun
Attorney, Agent, or Firm—Nikaido, Marmelstein, Murray & Oram LLP

[57] ABSTRACT

An optical piece reproduces information from a spiral track of a disk. The pickup device includes the first to sixth photoelectric conversion devices. The first and fourth devices are disposed next to each other along the direction of the track of the disk; the second and third devices are disposed next to each other along the direction of the track. The first and second devices are disposed next to each other along the direction perpendicular to the track direction; the third and fourth devices are disposed next to each other along the direction perpendicular to the track direction. The fifth and sixth devices are disposed on both sides of the unit composed of the first to fourth devices along the track direction. The outputs of the first and third devices are added. The outputs of the second and fourth devices are added. The outputs of the fifth and sixth devices are subtracted from each other. The added and subtracted signals are outputted via output terminals.

12 Claims, 4 Drawing Sheets

OPTICAL PICKUP DEVICE FOR REPRODUCING INFORMATION RECORDED ON A RECORDING MEDIUM

BACKGROUND OF THE INVENTION

1. Field of the Invention

The present invention relates to an optical pickup device for use in a reproduction apparatus for CDs (compact discs), MDs (minidiscs), LDs (laser disks), DVDs (digital video disks), and similar media.

2. Description of the Prior Art

An optical pickup device is provided with a plurality of photoelectric conversion devices for reading a main signal from an information recording medium (disk) and for controlling focusing and tracking of the optical pickup device. The outputs from those photoelectric conversion devices are fed through lead-wires to the main circuit board of the reproduction apparatus.

For example, an optical pickup device of the type that controls its focus by the astigmatic method is provided with six photoelectric conversion devices in total. Of these photoelectric conversion devices, four constitute a group for signal reading and focus control, and the other two, disposed on both sides of the group of four photoelectric conversion devices along the direction of the track, constitute a pair for tracking control.

While the optical pickup device is moved in a direction of a radius of the disk, the lead-wires for conducting signals to the main circuit board are constantly subjected to mechanical force. This often causes bad contact, and, as a matter of fact, such bad contact occurs as many times more frequently as the number of lead-wires.

SUMMARY OF THE INVENTION

An object of the present invention is to provide an optical pickup device with fewer output terminals for signal extraction.

Another object of the present invention is to provide an optical pickup device that, despite having fewer output terminals, ensures easy extraction of signals that are used for correct positioning of the optical pickup device when it is fitted to the reproduction apparatus.

To achieve the above objects, according to the present invention, an optical pickup device is provided with a first, a second, a third, and a fourth photoelectric conversion device, the first and fourth, and the second and third photoelectric conversion devices being disposed next to each other along a direction of a track of a recording medium, the first and second, and the third and fourth photoelectric conversion devices being disposed next to each other along a direction perpendicular to the direction of the track; a fifth and a sixth photoelectric conversion device disposed on both sides of a unit composed of the first, second, third, and fourth photoelectric conversion devices along the direction of the track; a first synthesizing circuit for adding together outputs from the first and third photoelectric conversion devices; a second synthesizing circuit for adding together outputs from the second and fourth photoelectric conversion devices; a third synthesizing circuit for obtaining a difference between outputs from the fifth and sixth photoelectric conversion devices; and a first, a second, and a third output terminal connected to the first, second, and third synthesizing circuit, respectively. Thus, only three lead-wires are needed to transfer reproduction signals to the main circuit board of the reproduction apparatus.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
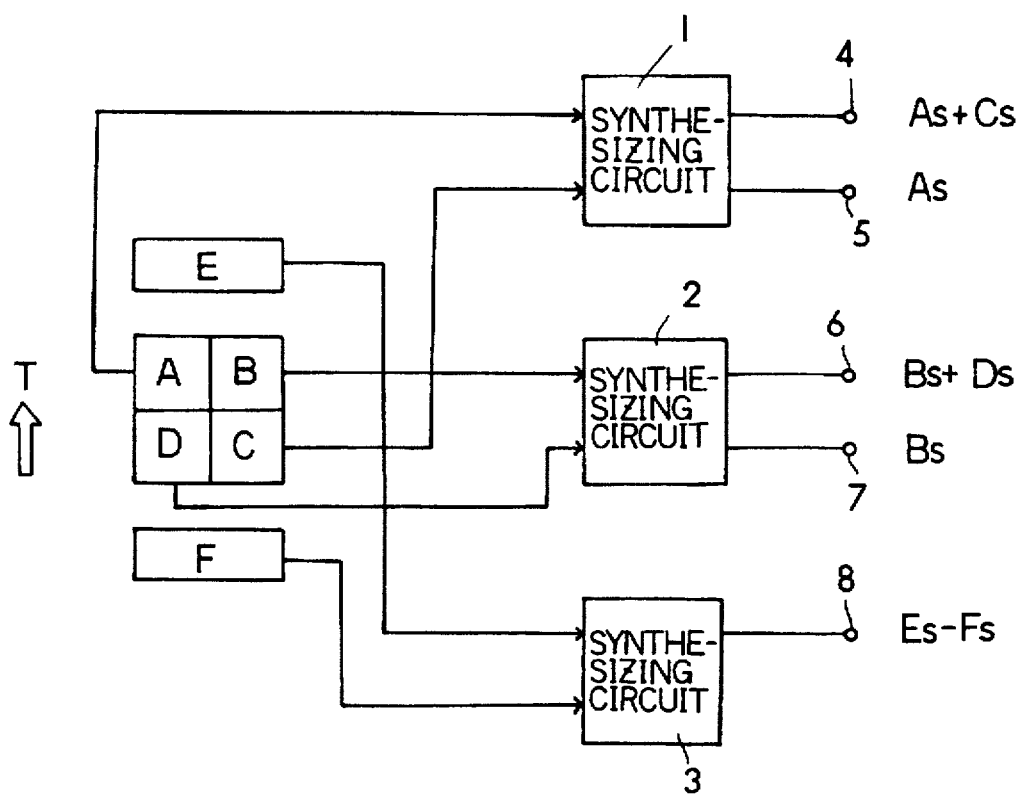
FIG. 1 is a block diagram showing a first embodiment of the optical pickup device according to the present invention.

Hereinafter, embodiments of the present invention will be described with reference to the drawings. FIG. 1 is a block diagram of an optical pickup device as a first embodiment of the present invention. In this optical pickup device, a group of four photoelectric conversion devices A, B, C, and D, each composed of a photodiode or the like, are arranged as shown in FIG. 1, and, in addition, a pair of photoelectric conversion devices E and F for controlling tracking are disposed on both sides of the group of four photoelectric conversion devices A, B, C, and D along the direction T of the track of a disk (not shown). This optical pickup device is of the type that controls its focus by the astigmatic method. In the following descriptions, the photoelectric conversion devices A to F are also referred to as A, B, C, D, E, and F for simplicity's sake.

Numeral 1 represents a synthesizing circuit that receives the outputs $A_s$ and $C_s$ of A and C and outputs a composite output $A_s+C_s$ thereof together with an individual output $A_s$ of A. Numeral 2 represents a synthesizing circuit that receives the outputs $B_s$ and $D_s$ of B and D and outputs a composite output $B_s+D_s$ thereof together with an individual output $B_s$ of B. Numeral 3 represents a subtraction circuit that receives the outputs $E_s$ and $F_s$ of E and F and outputs a difference $E_s-F_s$ between them. Numeral 4 represents an output terminal for outputting $A_s+C_s$, numeral 5 represents an output terminal for outputting $A_s$, numeral 6 represents an output terminal for outputting $B_s+D_s$, numeral 7 represents an output terminal for outputting $B_s$, and numeral 8 represents an output terminal for outputting $E_s-F_s$.

Figure 2:
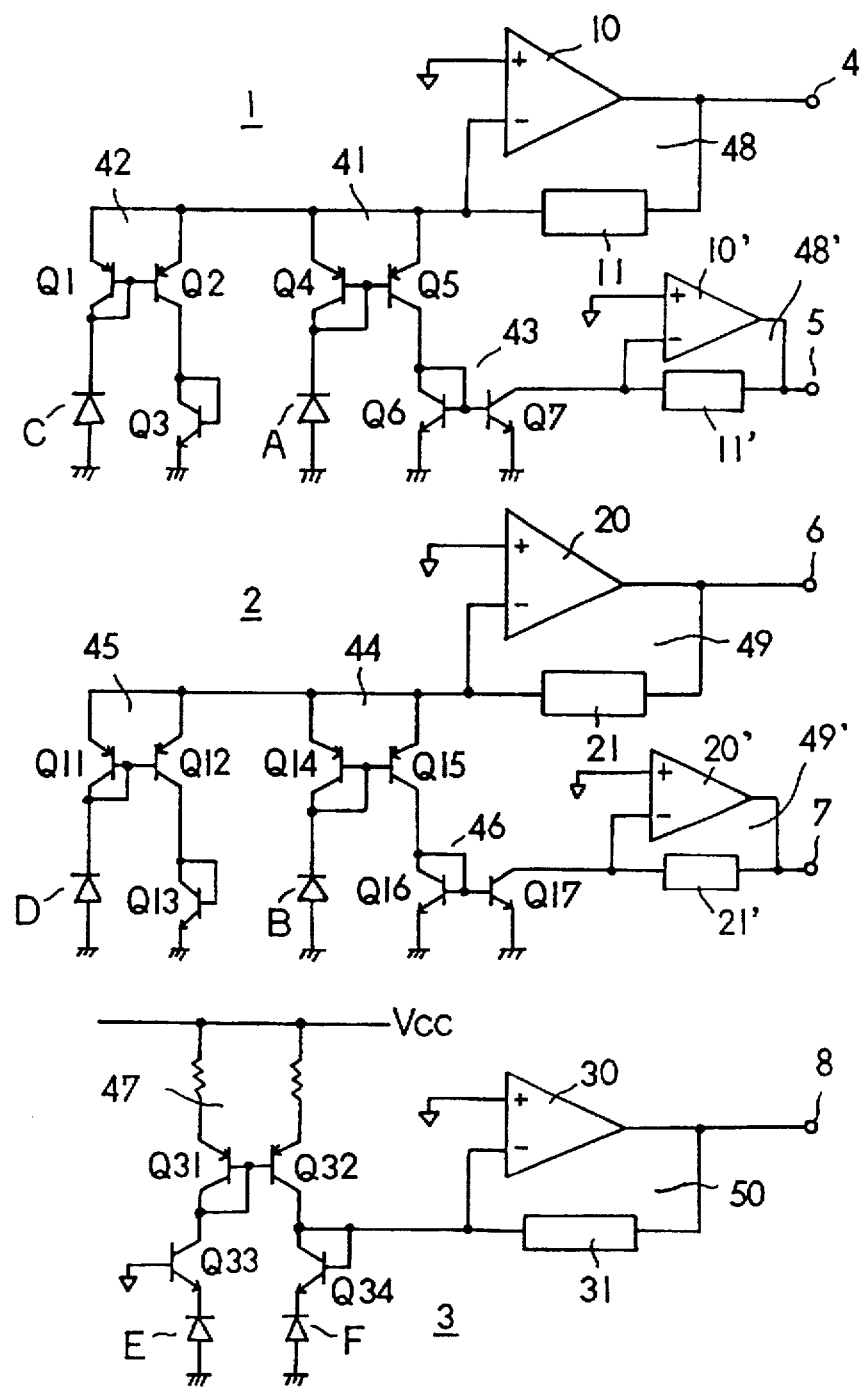
FIG. 2 is a circuit diagram showing the detailed circuit construction of the optical pickup device of the first embodiment.

FIG. 2 is a circuit diagram of the optical pickup device of FIG. 1. In FIG. 2, numeral 41 represents a first current mirror circuit including pnp-transistors Q4 and Q5. The photoelectric conversion device A is connected to the input side of the first current mirror circuit 41. Numeral 42 represents a second current mirror circuit including pnp-transistors Q1 and Q2. The photoelectric conversion device C is connected to the input side of the second current mirror circuit 42.

One end of the output current path of each of the first and second current mirror circuits 41 and 42 is connected to a first current-to-voltage conversion circuit 48. The first current-to-voltage conversion circuit 48 receives the composite output current of the photoelectric conversion devices A and C through the first and second current mirror circuits 41 and 42, and converts the current into a voltage for output via the output terminal 4.

The first current-to-voltage conversion circuit 48 consists of an operational amplifier 10 and a current-to-voltage conversion device 11. Specifically, the current-to-voltage conversion device 11 is realized as a feedback resistor. The operational amplifier 10 has its non-inverting terminal (+) connected to a reference voltage, and its inverting terminal (−) connected to one end of the output current path of each of the first and second current mirror circuits 41 and 42 and to one end of the current-to-voltage conversion device 11.

The other end of the output current path of the first current mirror circuit 41 is connected to a third current mirror circuit 43. The third current mirror circuit 43 includes npn-type transistors Q6 and Q7, and its output is fed through a third current-to-voltage conversion circuit 48' to the output terminal 5.

The components described heretofore in connection with FIG. 2 constitute the synthesizing circuit 1 of FIG. 1. The synthesizing circuit 2 has substantially the same circuit construction as the synthesizing circuit 1, and the only difference is that, in the former, the photoelectric conversion devices B and D are connected to the input side of the two current mirror circuits. As shown in FIG. 2, the synthesizing circuit 2 is constituted of a fourth current mirror circuit 44, a fifth current mirror circuit 45, a sixth current mirror circuit 46, a second current-to-voltage conversion circuit 49, and a fourth current-to-voltage conversion circuit 49'.

As shown in FIG. 2, the subtraction circuit 3 is constituted of a seventh current mirror circuit 47 including pnp-type transistors Q31 and Q32, an npn-type transistor Q33 whose collector is connected to the collector of the input-side transistor Q31 of the seventh current mirror circuit 47, and an npn-type transistor Q34 which is so connected as to serve as a diode and whose collector is connected to the collector of the output-side transistor Q32 of the seventh current mirror circuit 47. The photoelectric conversion device E is connected between the emitter of the transistor Q33 and ground, and the photoelectric conversion device F is connected between the emitter of the transistor Q34 and ground.

The differential current appearing at the junction between the transistors Q32 and Q34 (that is, the difference between the currents outputted from the photoelectric conversion devices E and F) is fed to a fifth current-to-voltage conversion circuit 50. The fifth current-to-voltage conversion circuit 50, as well as the second current-to-voltage conversion circuit 49, has the same circuit construction as the first current-to-voltage conversion circuit 48.

In the first embodiment described above, at the output terminals 4 to 8 appear the currents $A_s+C_s$, A, $B_s+D_s$, $B_s$, and $E_s-F_s$, respectively. Of these currents, only $A_s+C_s$, $B_s+D_s$, and $E_s-F_s$ need to be fed to the main circuit board of the reproduction apparatus. This is because the main signal recorded on the disk is obtained as $A_s+B_s+C_s+D_s$, the focus error signal is obtained as $(A_s+C_s)-(B_s+D_s)$, and the tracking signal is obtained as $E_s-F_s$. Accordingly, of the output terminals shown in FIGS. 1 and 2, only the output terminals 4, 6, and 8 need to be connected to the main circuit board with lead-wires.

As described above, according to the present invention, the optical pickup device, which is incessantly moved in playback operations, is connected to the main circuit board, which is kept in a fixed position, with fewer lead-wires than ever. Specifically, whereas a conventional optical pickup device requires four lead-wires for connection, the optical pickup device of the embodiment under discussion requires only three lead-wires. This accordingly reduces the possibility of bad contact being caused, and, even when the lead-wires are formed as a flexible printed circuit board, the reduction in the number of contacts contributes to the prevention of similar failure.

In the manufacture of the optical pickup device, the photoelectric conversion devices need to be fitted accurately in predetermined positions on the optical pickup device. This is achieved by measuring currents $(A_s+B_s)-(C_s+D_s)$ and $(A_s+D_s)-(B_s+C_s)$, for the positioning in the track direction T and in the direction perpendicular to the track direction, respectively. On such an occasion, the output terminals 4, 5, 6, and 7 are connected to the calculation circuit of positioning equipment to feed thereto $A_s+C_s$, $A_s$, $B_s+D_s$, and $B_s$. The calculation circuit then calculates $C_s$ from $(A_s+C_s)-A_s$ and $D_s$ from $(B_s+D_s)-B_s$, and eventually calculates, from $A_s$, $B_s$, $C_s$, and $D_s$ thus obtained, $(A_s+B_s)-(C_s+D_s)$ and $(A_s+D_s)-(B_s+C_s)$.

As seen from the above description, the signals directed to the output terminals 5 and 7 do not necessarily have to be $A_s$ and $B_s$, as shown in FIGS. 1 and 2, but may be $C_s$ and $D_s$ instead. In that case, it is necessary, in FIG. 2, to change the connection positions of the photoelectric conversion devices A and C with each other, and to change the connection positions of the photoelectric conversion devices B and D with each other.

Moreover, the signals directed to the output terminals 5 and 7 do not need to be a combination of $A_s$ and $B_s$, or $C_s$ and $D_s$, but may be $A_s$ and $D_s$, or $B_s$ and $D_s$, instead. This can be achieved easily by changing the connection positions of the photoelectric conversion devices accordingly.

Figure 3:
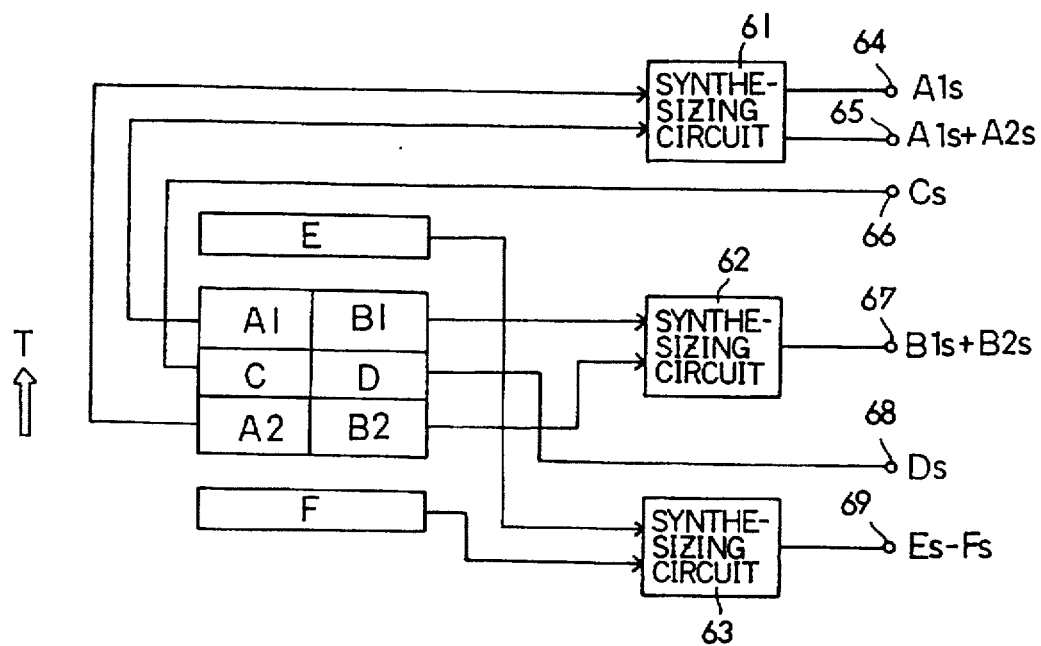
FIG. 3 is a block diagram showing a second embodiment of the optical pickup device according to the present invention.

FIG. 3 shows an optical pickup device as a second embodiment of the present invention. In this optical pickup device, photoelectric conversion devices C and D are arranged next to each other in the direction perpendicular to the track direction T, photoelectric conversion devices A1 and A2 are arranged on both sides of the photoelectric conversion device C along the track direction, and photoelectric conversion devices B1 and B2 are arranged on both sides of the photoelectric conversion device D along the track direction.

Furthermore, a pair of photoelectric conversion devices E and F for tracking control are arranged on both sides of the group of six photoelectric conversion devices mentioned above. This optical pickup device achieves focus control by the beam size method. In the beam size method, the main signal is obtained as $A1_s+A2_s+C_s+B1_s+B2_s+D_s$, the focus error signal is obtained as $(A1_s+A2_s+D_s)-(B1_s+B2_s+C_s)$, the tracking error signal is obtained as $E_s-F_s$, and the positioning signal is obtained as $A1_s-A2_s$.

In this embodiment, the positioning of the photoelectric conversion devices is required only in the track direction, but not in the direction perpendicular to the track direction. Accordingly, it is possible to use $B1_s-B2_s$ instead of $A1_s-A2_s$ as the positioning signal noted above.

In this embodiment, a synthesizing circuit 61 outputs A1, and $A1_s+A2_s$ to the output terminals 64 and 65, another synthesizing circuit 62 outputs $B1_s+B2_s$ to the output terminal 67, and a subtraction circuit 63 outputs $E_s-F_s$ to the output terminal 69. Although the outputs of the photoelectric conversion devices C and D are shown as being directly fed to the output terminals 66 and 68 in FIG. 3, they are in practice fed thereto through an amplifier or current-to-voltage conversion circuit.

The synthesizing circuit 61 has the same construction as the synthesizing circuit 1 of FIG. 2, except that it has the photoelectric conversion devices A1 and A2, instead of A and $C_s$ connected thereto. The synthesizing circuit 62 has the same construction as the synthesizing circuit 1 of FIG. 2, except that it has the photoelectric conversion devices B1 and B2, instead of A and C, connected thereto, and that it does not have the transistor Q7 and the third current-to-voltage conversion circuit 48'.

The subtraction circuit 63 has the same construction as the subtraction circuit 3 of FIG. 2. Moreover, the photoelectric conversion devices C and D are each connected to the current mirror circuit of a circuit that is similar to the synthesizing circuit 1 of FIG. 2 but that does not have the first and third current mirror circuits 41 and 43 nor the third current-to-voltage conversion circuit 48', that is, a circuit that only has the second current mirror circuit 42 and the first current-to-voltage conversion circuit 48.

For reproduction purposes, the signals appearing at the output terminals 65 to 69 are fed through lead-wires to the main circuit board of the reproduction apparatus. For positioning purposes, the signals appearing at the output terminals 64 and 65 are fed to the calculation circuit of positioning equipment, since $A1_s - A2_s$ can be calculated from $A1_s + A2_s$ and $A1_s$.

The optical pickup devices of the embodiments described heretofore are used in information reproduction apparatuses provided with means for driving a disk with information recorded in a spiral track thereof to rotate, means for moving the optical pickup device in the direction of a radius of the disk, and a processing circuit for processing the output that the optical pickup device yields as it reads the information from the track while moving. Specifically, such information reproduction apparatuses include players and drives for CDs, MDs, LDs, DVDs, and similar media.

Figure 4:
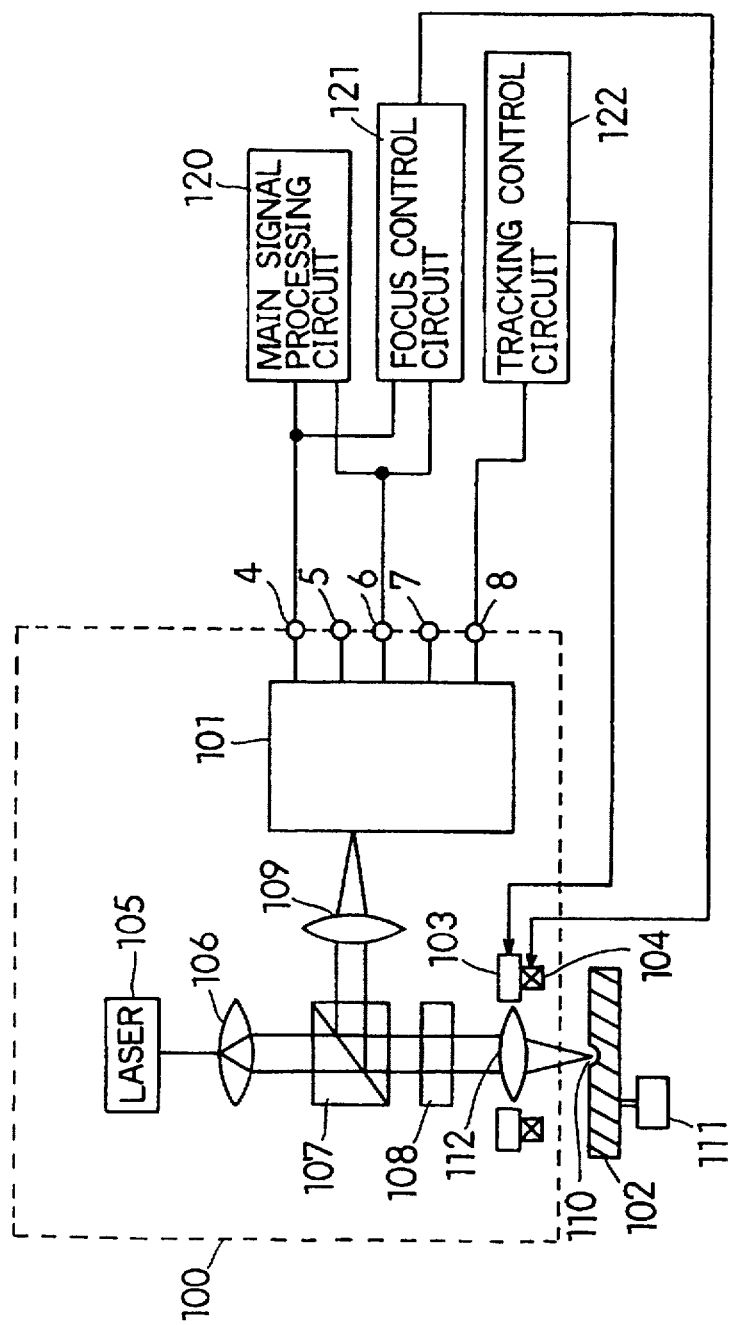
FIG. 4 is a diagram showing the construction of an information reproduction apparatus employing the optical pickup device according to the present invention.

FIG. 4 shows an example of such an information reproduction apparatus. In FIG. 4, numeral 100 represents an optical pickup device, numeral 102 represents a disk, numeral 110 represents the track of the disk, and numeral 111 represents a disk driver. Numeral 105 represents a laser light source, numeral 106 represents a coupling lens, numeral 107 represents a beam splitter, numeral 108 represents a λ/4 plate (λ represents the wavelength of light), numeral 112 represents an objective lens, numeral 103 represents a tracking actuator, numeral 104 represents focus actuator, numeral 109 represents a condenser lens, numeral 101 represents a circuit as shown in FIG. 1, numeral 120 represents a main signal processing circuit, numeral 121 represents a focus control circuit, and numeral 122 represents a tracking control circuit. In FIG. 4, it is possible to use the circuit of FIG. 3 instead of the circuit 101 of FIG. 1.

As described above, according to the present invention, signals required for reproduction can be transferred from an optical pickup device to the main circuit board of a reproduction apparatus with a fewer number of lead-wires. This reduces the possibility of bad contact being caused by the incessant movement of the optical pickup device.

What is claimed is:

1. An optical pickup device whose focus is controlled by an astigmatism method, comprising:

a first, a second, a third, and a fourth photoelectric conversion device, the first and fourth, and the second and third photoelectric conversion devices being disposed next to each other along a direction of a track of a recording medium, the first and second, and the third and fourth photoelectric conversion devices being disposed next to each other along a direction perpendicular to the direction of the track;

a fifth and a sixth photoelectric conversion device disposed on both sides of a unit composed of the first, second, third, and fourth photoelectric conversion devices along the direction of the track;

a first synthesizing circuit for adding together outputs from the first and third photoelectric conversion devices;

a second synthesizing circuit for adding together outputs from the second and fourth photoelectric conversion devices;

a third synthesizing circuit for obtaining a difference between outputs from the fifth and sixth photoelectric conversion devices; and a first, a second, and a third output terminal connected to the first, second, and third synthesizing circuit, respectively.

2. An optical pickup device as claimed in claim 1, wherein signals outputted via the first and second output terminals are used for focus control and for main signal reproduction, and a signal outputted via the third output terminal is used for tracking control.

3. An optical pickup device as claimed in claim 1, further comprising a fourth output terminal for outputting an output of either the first or third photoelectric conversion device, and a fifth output terminal for outputting an output of either the second or fourth photoelectric conversion device.

4. An optical pickup device as claimed in claim 3, further comprising:

a first current mirror circuit whose input is connected to the first photoelectric conversion device;

a second current mirror circuit whose input is connected to the third photoelectric conversion device;

a first current-to-voltage conversion circuit connected to one end of an output current path of each of the first and second current mirror circuits;

a third current mirror circuit connected to another end of the output current path of either of the first and second current mirror circuit;

a third current-to-voltage conversion circuit connected to an output current path of the third current mirror circuit;

a fourth current mirror circuit whose input is connected to the second photoelectric conversion device;

a fifth current mirror circuit whose input is connected to the fourth photoelectric conversion device;

a second current-to-voltage conversion circuit connected to one end of an output current path of each of the fourth and fifth current mirror circuits;

a sixth current mirror circuit connected to another end of the output current path of either of the fourth and fifth current mirror circuit; and a fourth current-to-voltage conversion circuit connected to an output current path of the sixth current mirror circuit, wherein the first, second, third, and fourth current-to-voltage conversion circuits are connected to the first, second, third, fourth, and fifth output terminals, respectively.

5. An optical pickup device whose focus is controlled by a beam size method, comprising:

photoelectric conversion devices C and D disposed next to each other along a direction perpendicular to a direction of a track of a recording medium;

photoelectric conversion devices A1 and A2 disposed on both sides of the photoelectric conversion device C along the direction of the track;

photoelectric conversion devices B1 and B2 disposed on both sides of the photoelectric conversion device D along the direction of the track;

a plurality of output terminals for individually outputting a composite output of the photoelectric conversion devices A1 and A2, a composite output of the photoelectric conversion devices B1 and B2, an output of the photoelectric conversion device $C_s$ and an output of the photoelectric conversion device D;

an output terminal for outputting an output of the photoelectric conversion device A1, A2, B1, or B2 for positioning of the optical pickup device.

6. An optical pickup device as claimed in claim 5, wherein the composite output of the photoelectric conversion devices A1 and A2 is obtained by joining together one end of an output current path of each of a first and a second current mirror circuit whose input is connected to the photoelectric conversion device A1 and A2, respectively, and the composite output of the photoelectric conversion devices B1 and B2 is obtained by joining together one end of an output current path of each of a third and a fourth current mirror circuit whose input is connected to the photoelectric conversion device B1 and B2, respectively, and wherein a signal outputted from the output terminal for positioning is obtained from another end of the output current path of the first, second, third, or fourth current mirror circuit.

7. An information reproduction apparatus provided with means for driving a disk having information recorded in a spiral track thereof to rotate, an optical pickup device for reading the information from the track while moving in a direction of a radius of the disk, and a processing circuit for processing an output from the optical pickup device, wherein the optical pickup device comprises:
   a first, a second, a third, and a fourth photoelectric conversion device, the first and fourth, and the second and third photoelectric conversion devices being disposed next to each other along a direction of a track of a recording medium, the first and second, and the third and fourth photoelectric conversion devices being disposed next to each other along a direction perpendicular to the direction of the track;
   a fifth and a sixth photoelectric conversion device disposed on both sides of a unit composed of the first, second, third, and fourth photoelectric conversion devices along the direction of the track;
   a first synthesizing circuit for adding together outputs from the first and third photoelectric conversion devices;
   a second synthesizing circuit for adding together outputs from the second and fourth photoelectric conversion devices;
   a third synthesizing circuit for obtaining a difference between outputs from the fifth and sixth photoelectric conversion devices; and
   a first, a second, and a third output terminal connected to the first, second, and third synthesizing circuit, respectively.

8. An information reproduction apparatus as claimed in claim 7, wherein signals outputted via the first and second output terminals are used for focus control and for main signal reproduction, and a signal outputted via the third output terminal is used for tracking control.

9. An information reproduction apparatus as claimed in claim 7, further comprising a fourth output terminal for outputting an output of either the first or third photoelectric conversion device, and a fifth output terminal for outputting an output of either the second or fourth photoelectric conversion device.

10. An information reproduction apparatus as claimed in claim 9, further comprising:
   a first current mirror circuit whose input is connected to the first photoelectric conversion device;
   a second current mirror circuit whose input is connected to the third photoelectric conversion device;
   a first current-to-voltage conversion circuit connected to one end of an output current path of each of the first and second current mirror circuits;
   a third current mirror circuit connected to another end of the output current path of either of the first and second current mirror circuit;
   a third current-to-voltage conversion circuit connected to an output current path of the third current mirror circuit;
   a fourth current mirror circuit whose input is connected to the second photoelectric conversion device;
   a fifth current mirror circuit whose input is connected to the fourth photoelectric conversion device;
   a second current-to-voltage conversion circuit connected to one end of an output current path of each of the fourth and fifth current mirror circuits;
   a sixth current mirror circuit connected to another end of the output current path of either of the fourth and fifth current mirror circuit; and
   a fourth current-to-voltage conversion circuit connected to an output current path of the sixth current mirror circuit,
   wherein the first, second, third, and fourth current-to-voltage conversion circuits are connected to the first, second, third, fourth, and fifth output terminals, respectively.

11. An information reproduction apparatus provided with means for driving a disk having information recorded in a spiral track thereof to rotate, an optical pickup device for reading the information from the track while moving in a direction of a radius of the disk, and a processing circuit for processing an output from the optical pickup device, wherein the optical pickup device comprises:
   photoelectric conversion devices C and D disposed next to each other along a direction perpendicular to a direction of a track of a recording medium;
   photoelectric conversion devices A1 and A2 disposed on both sides of the photoelectric conversion device C along the direction of the track;
   photoelectric conversion devices B1 and B2 disposed on both sides of the photoelectric conversion device D along the direction of the track;
   a plurality of output terminals for individually outputting a composite output of the photoelectric conversion devices A1 and A2, a composite output of the photoelectric conversion devices B1 and B2, an output of the photoelectric conversion device $C_s$ and an output of the photoelectric conversion device D;
   an output terminal for outputting an output of the photoelectric conversion device A1, A2, B1, or B2 for positioning of the optical pickup device.

12. An optical pickup device as claimed in claim 11, wherein the composite output of the photoelectric conversion devices A1 and A2 is obtained by joining together one end of an output current path of each of a first and a second current mirror circuit whose input is connected to the photoelectric conversion device A1 and A2, respectively, and the composite output of the photoelectric conversion devices B1 and B2 is obtained by joining together one end of an output current path of each of a third and a fourth current mirror circuit whose input is connected to the photoelectric conversion device B1 and B2, respectively, and wherein a signal outputted from the output terminal for positioning is obtained from another end of the output current path of the first, second, third, or fourth current mirror circuit.

* * * * *